United States Patent [19]
Wentinck et al.

[11] Patent Number: 6,092,921
[45] Date of Patent: Jul. 25, 2000

[54] FLUID MIXER AND PROCESS USING THE SAME

[75] Inventors: Hendrik Martinus Wentinck; Arend Van Wolfswinkel, both of Amsterdam, Netherlands

[73] Assignee: Shell Oil Company, Houston, Tex.

[21] Appl. No.: 09/004,072

[22] Filed: Jan. 7, 1998

[30] Foreign Application Priority Data

Jan. 7, 1997 [EP] European Pat. Off. ............. 97200033

[51] Int. Cl.⁷ ............................ B01F 15/00; B01F 15/06; C07C 1/02
[52] U.S. Cl. ................... 366/174.1; 252/373; 366/174.1; 366/175.2; 366/336; 366/338; 422/225; 431/7
[58] Field of Search ................. 252/373; 366/174.1, 366/175.2, 336, 338; 422/224, 225, 228; 431/7

[56] References Cited

U.S. PATENT DOCUMENTS

| | | | |
|---|---|---|---|
| 2,021,092 | 11/1935 | Teliet | 366/174.1 |
| 3,020,234 | 2/1962 | Haumann | 366/336 |
| 3,376,023 | 4/1968 | Lage | 366/174 |
| 4,008,580 | 2/1977 | Heber et al. | 366/174.1 |
| 4,299,655 | 11/1981 | Skaugen | 366/336 |

FOREIGN PATENT DOCUMENTS

| | | | |
|---|---|---|---|
| 2115978 | 10/1971 | Germany. | |
| 2203648 | 8/1972 | Germany. | |
| 60-137425 | 7/1985 | Japan | 366/174.1 |

*Primary Examiner*—Wayne Langel
*Attorney, Agent, or Firm*—Kim Muller

[57] ABSTRACT

Apparatus for mixing reactive fluids which are capable of ignition or explosion, at elevated temperature and pressure, for subsequent conversion by contact with a catalyst, such as a (partial) oxidation catalyst or in a combustion zone, comprising in sequence an upstream inlet end, a mixer, an expander, a diffuser and a downstream outlet end, the outlet end being characterised by a greater available cross-sectional area than any of the inlet end, mixer and expander, and the expander having substantially increasing internal cross-sectional area in downstream direction, wherein the available cross-sectional area of the expander at any point along its length is less than the difference in internal cross-section of the expander at its downstream and its upstream ends, a process therefor and the use thereof, in particular the use thereof in a process for the catalytic partial oxidation of hydrocarbon feedstock.

6 Claims, 1 Drawing Sheet

6,092,921

FLUID MIXER AND PROCESS USING THE SAME

FIELD OF THE INVENTION

The present invention relates to an apparatus for mixing and diffusion of reactive fluids, a process therefor and the use thereof, in particular to an apparatus for the rapid and effective mixing of respective fluid streams and diffusion thereof to provide a mixed stream of expanded cross-sectional area, a process therefor and the use thereof in a process for the conversion of a fluid substrate at elevated space velocity, temperature and pressure, more particularly in a process for the catalytic partial oxidation of hydrocarbon feedstock.

BACKGROUND OF THE INVENTION

Conversion processes employing rapid-reaction zones such as oxidation or combustion zones for the conversion of a gaseous or liquid fluid substrate in axial flow require a means for the mixing of the substrate in desired ratio with an oxidation or combustion gas for uniform contact with desired residence time within the reaction zone. Non-uniform mixing, i.e. composition, and non-uniform velocity, i.e. residence time, may lead to over or under reaction and, where this is critical, are typical of poor quality or poor yield processes. Efficient mixing may for example be achieved with use of large mixing volumes, diffuser rings placed in-stream, or of small mixing volumes operating at high superficial velocities. The mixer should moreover not introduce an unacceptable pressure differential or excessively small fluidstream dimensions which may introduce unacceptable changes in critical flow impedance by fouling or erosion.

A further hazard arises with the above conversion processes employing flammable fluids which are liable to ignition or explosion in the event of misoperation. The hazard may be considerably lessened by minimising flammable-fluid volumes in potential hazard zones and by operation at elevated superficial velocity of flammable fluids whereby residence time is less than the auto-ignition delay period. The mixing of such fluids in elevated-pressure conversion processes is possibly the single most hazardous operational stage upstream of the reaction zone, and hence the volume and superficial velocity of the mixed fluids upstream of the reaction zone is critical.

European patent application No. 656,317 contains a description of a process for the catalytic partial oxidation of a hydrocarbon feedstock in which the hydrocarbon is mixed with an oxygen-containing gas and contacted with a catalyst. The catalyst is retained in a fixed arrangement having a high tortuosity (defined as the ratio of the length of the path followed by a gas flowing through the structure to the length of the shortest possible straight line path through the structure) of at least 1.1 and having at least 750 pores per square centimetre. The catalyst preferably comprises a catalytically active metal supported on a carrier. Suitable carrier materials are described as including the refractory oxides, such as silica, alumina, titania, zirconia and mixtures thereof. A catalyst comprising a zirconia refractory foam as carrier is specifically exemplified. Comparable processes are described in European patent application Nos. 576,096 and 629,578, and in International patent application WO 96/04200.

An attractive catalytic partial oxidation process for application on a commercial scale would operate at elevated pressures, typically in excess of 10 bara, for example at around 50 bara, and at high gas hourly space velocities (normal litres of gas per kilogram of catalyst per hour), typically of the order of 20,000 to 100,000,000 Nl/kg/hr (Nl being the volume at STP (0° C., 1 bara)). Due to the thermodynamic behaviour of the partial oxidation reaction, in order to obtain a high yield of carbon monoxide and hydrogen at elevated pressures, it is necessary to operate the reaction at elevated temperatures. Temperatures of the order of 800° C. or higher, in some cases 1000° C. or higher, are necessary for obtaining the yields demanded of a commercial process.

The operation of these processes is critical in terms of:

(1) the need to control operating conditions, uniform feedstock mixing and velocity, and catalyst and feedstock contacting, in order to substantially prevent reduced conversion to desired products due to insufficient or excess oxidation;

(2) the need for low superficial velocity of feedstock at the catalyst; and (3) the need to reduce hazardous mixed feedstock volumes and residence times to minimise the chance of ignition and explosion under elevated-pressure conditions.

There is a need for a means for mixing reactive gaseous fluids in such elevated-pressure processes with uniformity of composition and velocity, to provide the desired catalyst and feedstock contacting, without increasing mixed fluid volumes or residence time in view of ignition or explosion hazard, without increasing superficial velocity to create excessive pressure differential at the catalyst, and without unacceptable changes in critical flow impedance by fouling or erosion.

Gas and fluid mixers are known, for example in partial combustion processes for the controlled combustion of hydrocarbon gases in the presence of oxygen-containing gases for acetylene production, comprising hollow conical chambers of increasing cross-sectional area in downstream direction. Diffusers are also known for the divergence of a gas or fluid stream, typically with increase of stream cross-sectional area, in manner to maintain uniformity of velocity, and to minimise recirculation (by minimising residence time) and pressure differential. For example total combustion processes employ fluid-flow diverters such as disc or tube shaped structures extending radially perpendicular to the fluid-flow path and comprising outlet apertures in the downstream disc or elongate face thereof whereby radial outward flow of fluid is encouraged by constrained outlet apertures. Also known are diffusers, comprising a hollow diffuser cone and a (manifold of) hollow rotation symmetric splitting vanes of truncated conical form thereby providing a profile to assist in maintaining and minimising the above-mentioned properties.

It will be apparent that these known devices are inadequate for the mixing and diffusion of flammable fluids, for example as required in the aforementioned conversion processes at elevated pressures which are characterised by reduced auto-ignition delay periods, and the danger of elevated-pressure explosion, bringing into conflict the constraints of the above mixers in terms of minimising ignition or explosion hazard, pressure drop, changes in critical flow impedance and optimising fluid mixing by means of uniform composition and velocity in desired ratio to obtain high quality and high yield conversion products.

SUMMARY OF THE INVENTION

Accordingly there is a need for a means for mixing and diffusing flammable, reactive fluids for application in conversion processes as hereinbefore mentioned in a manner sufficient to satisfy both the safety and the performance requirements, for the limitation of damage in the event of a misoperation, without prejudice to the yield and efficiency of the process such as by imposing operation under extreme conditions.

We have now surprisingly found that an apparatus and process for mixing and diffusion of reactive fluids may be provided in manner whereby excellent mixing is obtained in downstream direction, without conflict of the hereinbefore mentioned constraints. In particular the apparatus and process minimises fluid volume in the mixer at high superficial velocity and in a subsequent divergence lowers the superficial velocity, whereby ignition and explosion hazard is minimised, without excessive pressure differential or change in critical flow impedance across the mixer, whereby operational problems are minimised, and which nevertheless serves to provide a mixed fluid stream adapted for excellent conversion quality and yield in a subsequent reaction zone.

Accordingly in its broadest aspect the invention relates to an apparatus for mixing reactive fluids which are capable of ignition or explosion, at elevated temperature and pressure, for subsequent conversion by contact with a catalyst, such as a (partial) oxidation catalyst or in a combustion zone, comprising in sequence an upstream inlet end, a mixer, an expander, a diffuser and a downstream outlet end, the outlet end being characterised by a greater available cross-sectional area than any of the inlet end, mixer and expander, and the expander having substantially increasing internal cross-sectional area in downstream direction, wherein the available cross-sectional area of the expander at any point along its length is less than the difference in internal cross-sectional area of the expander at its downstream and its upstream ends.

DETAILED DESCRIPTION OF THE INVENTION

Preferably the available cross-sectional area of the expander is less than 75%, more preferably less than 50%, still more preferably less than 25% of the difference in internal cross-sectional area of the expander at its downstream and upstream ends. The internal cross-sectional area of the expander at its downstream end is suitably at least 4 times the internal cross-sectional area at the upstream inlet end, preferably 5 to 100 times, more preferably 10 to 60 times.

It will be appreciated that the apparatus of the invention enables the mixing and diffusion of fluids by initial expansion of fluid stream in terms of greatest cross-sectional dimension (i.e. by increasing the internal cross-sectional area) without significant increase, i.e. up to 5 times, especially up to 3 times, preferably up to 2 times, of fluid-stream cross-sectional area (i.e. available cross-sectional area), and by subsequent divergence of fluid-stream cross-sectional area in manner to meet the hereinbefore mentioned objectives.

References herein to cross-sectional area of stream or apparatus is to the area of the cross-section taken through a plane perpendicular to the stream or apparatus longitudinal axis.

References herein to "available" and "internal" cross-sectional area respectively are to the area available for a fluid stream, i.e. the fluid-stream cross-sectional area, and to the area defined by, and enclosed within, the internal walls of the apparatus, i.e. the area enclosed by the confines of (mixed) fluid stream, respectively. The latter may include area which is unavailable to a fluid stream. The available cross-section will be determined with reference to ignition or explosion hazard constraint, and to constraint of unacceptable change in critical flow impedance. Where the internal cross-sectional area of the expander at its downstream section and of the diffuser at its upstream section, i.e. at the interface thereof, are rapidly changing, the internal cross-section of the expander at its downstream end will be taken to be the maximum internal cross-sectional area of the expander or to be a slightly lesser value corresponding to any profiling of the expander or the diffuser.

Reference herein to an expander or to the expansion of a fluid stream is to the apparatus or process for the spreading of the fluid stream to provide a fluid-stream front of cross-sectional area corresponding to the available cross-sectional area of the expander, and of increased greatest fluid-stream cross-sectional dimension. Preferably such stream front does not contain any in-stream objects, partitions or the like, which favour flame stabilisation or ignition. Preferably the expander comprises an upstream fluid receiving end, a spreading section and a downstream delivery end wherein the available cross-sectional area is substantially as hereinbefore defined and the internal cross-sectional area is largest at the downstream delivery end.

Reference herein to a diffuser or to the diffusion of a fluid stream is to the apparatus or process for the divergence of the fluid stream to provide a fluid-stream front of increased cross-sectional area at the downstream end of the diffuser, thereby reducing superficial velocity while maintaining uniformity of velocity. Preferably the available cross-sectional area at the upstream receiving section of the diffuser is therefore rapidly increasing, to equalise with the internal cross-sectional area thereof, whereby the diffuser is of substantially constant and equal internal and available cross-sectional area at its downstream section.

Preferably the upstream receiving section of the diffuser is profiled in order to direct the expanded mixed fluid stream flow towards the axis, thereby substantially preventing recirculation in known manner, for example the internal cross-sectional area slightly decreases in downstream direction.

Preferably by the present invention any accidental flames following ignition occurring in the downstream section of the diffuser, inherent with providing a mixed stream front of expanded cross-sectional area as hereinbefore defined, are confined to the downstream section of the diffuser chamber of the apparatus of the invention, due to the uniformly high fluid-stream velocity in the expander and in the upstream receiving section of the diffuser.

Reference herein to fluid stream is to any desired form or geometry of confined fluid duct, for example of continuous or polygonal confines, such as circular, oval, hexagonal flow and the like. It will be appreciated that for high pressure, high space velocity operation it is preferred to operate with substantially continuously confined fluid streams. Accordingly the confines of the apparatus of the invention, for example the catalyst mounting and the like in a reaction zone, are suitably adapted to be continuous with the downstream fluid-stream confines thereby minimising fluid-stream deviation and hence development of ignition or explosion hazard.

Preferably the expander comprises an insert which is substantially non-porous and which is adapted to be located in the expander, thereby modifying the available cross-section thereof. Such insert may be of any desired shape or form adapted to the aforementioned objects. Preferably the insert comprises an upstream and a downstream section, wherein the upstream section has a substantially increasing cross-sectional area in the downstream direction and the cross-sectional area is largest at the interface of the upstream and downstream section, whereby the insert is adapted to be axially mounted within the expander thereby having its interface of the upstream and downstream section at the downstream end of the expander in manner to provide a substantially annular fluid stream path in the expander of increasing radius in downstream direction.

The outer surface of the insert and the inner surfaces of the expander and of the upstream receiving section of the diffuser may be of substantially similar profile. The insert may, however, provide a concave profiled upstream section adapted to receive the fluid stream with minimum pressure differential formation, and may be similarly profiled at its downstream section, as hereinbefore defined for the upstream receiving section of the diffuser, in order to direct the expanded mixed fluid-stream flow towards the axis, thereby substantially preventing recirculation in known manner. The insert may comprise a convex profiled downstream section which projects into the diffuser section of the apparatus.

It is convenient to define the expander and the upstream section of the insert by a cone half angle which may be in the range of 30° to 90° to the axis, preferably in the range of 30° to 80°, more preferably in the range of 50° to 70°. The cone half angle is suitably selected with reference to other parameters such as fluid space velocity, acceptable pressure differential, profiling of expander, insert, and diffuser upstream section and acceptable residence time in the expander.

Reference herein to the cone half angle is to the angle defined by the cone central longitudinal axis and any "generator"; i.e. line contained in the cone surface thereof.

Suitably the expander and insert are defined by the same or different ratio of average axial length to average diameter in the range of from 1:20 to 1:1, preferably 1:15 to 1:1, more preferably in the range of from 1:4 to 1:1. The relative and particular dimensions may for example depend on the acceptable residence time, the acceptable pressure differential for given operating conditions and the ignition or explosion hazard.

The insert may be mounted in the expander in any desired manner. Suitably the insert may be mounted by axial or surface attachment, for example by means of one or more projections, recesses or attachments extending therefrom or associated therewith at the upstream and/or downstream ends thereof adapted to be associated with corresponding recesses, projections or attachments in the expander and/or diffuser wall, and the like. The manner of mounting may be selected in known manner with reference to the nature of materials employed, the temperature and pressure differential effects thereof and constraints with respect to flame stabilisation or ignition.

Suitably the expander and diffuser are constructed in two respective parts, each comprising a truncated cone surface, adapted to be placed about an insert as hereinbefore defined and secured at the truncations by means of associating faces thereof, for example flanged projections thereof in known manner.

The apparatus may be employed in any desired orientation, for example in vertical or horizontal substrate flow. The apparatus may also have any dimensions as hereinbefore defined, in particular may be of any desired magnitude, provided that the residence time does not exceed the auto-ignition delay period, the advantageous effects thereof being essentially scale independent. Typically, the apparatus has a cross-section, in its largest dimension, in the range of from 1 to 50 cm, in particular from 5 to 40 cm.

The apparatus comprises means for mixing the respective fluids to be reacted as hereinbefore defined. Suitably the apparatus comprises a mixer at its upstream end which is adapted for rapid and thorough mixing of respective fluids for reaction. The mixer preferably comprises respective inlet means for each fluid adapted to enter as a fluid stream at desired space velocity. Preferably the inlet means are provided in respective conduit means adapted to receive respective fluids to be mixed. Preferably conduit means open in suitable manner into a mixing chamber which may be upstream of or integral with mixed fluid conduit means. It is a particular advantage of this invention that both unidirectional and rotating mixers may be employed, with suitable profile adaptation of the expander, insert, and/or upstream section of the diffuser, as appropriate.

The apparatus of the invention may be adapted for mixing of two or more fluids.

The apparatus of the invention is adapted for use with elevated-pressure conversion processes as hereinbefore defined which are prone to ignition or explosion on misoperation. Preferably therefore the diffuser comprises a porous shield placed in the mixed fluid flow path at the downstream end thereof, whereby the velocity profile is improved, and so minimising unintentional ignition. A porous shield may comprise any suitable shield or cloth as known in the art and preferably comprises a flame-resistant material in the form of a fibres mesh, porous monolith such as foam and the like. It will be appreciated that such shield is suitably constructed in manner as not to interfere with the functioning of the reaction, and is characterised by a sufficiently high mechanical integrity and thermal-shock resistance to enable the functioning thereof.

The component parts of the apparatus may be constructed of any material adapted to the prevailing or incidental conditions which are to be employed. Suitably the diffuser, expander and insert, mixer and optional porous shield and their respective mountings comprise a temperature-stable metal alloy, preferably stainless steel or inconel.

The porous shield may alternatively or additionally comprise an inorganic material such as a refractory oxide, and comprise additional materials providing the required mechanical strength and the like, more preferably may comprise fibre reinforcement such as a continuous inorganic fibre reinforced inorganic matrix.

From the foregoing it will be apparent that the apparatus of the invention is admirably suited for use in processes as hereinbefore mentioned in manner to address the object of the invention. In particular it will be apparent that the apparatus enables operation of such processes without substantial interference or disruption thereof.

Accordingly there is provided in a further aspect of the invention a process for mixing reactive fluids which are capable of ignition or explosion, at elevated temperature and pressure, for subsequent conversion by contact with a catalyst, such as a (partial) oxidation catalyst or in a combustion zone, comprising providing respective fluids at an upstream stage of the process, mixing, expansion and diffusion thereof to provide a mixed fluid stream at a downstream stage of the process, the downstream stage being characterised by greater fluid stream cross-sectional area than any of the upstream, mixing and expansion stages, and the area enclosed by the mixed fluids stream confines being substantially increasing in downstream direction, wherein the mixed fluid steam cross-sectional area at any point in the expansion stage is less than the difference in the area enclosed by the mixed fluid stream confines at the downstream and upstream ends of the expansion stage. Preferably a process for the mixing and diffusion of reactive fluids employs an apparatus as hereinbefore defined.

The process of the invention is particularly adapted for use with mixing reactive fluids under conditions of ignition or explosion hazard, such as elevated temperature and pressure, more particularly for mixing oxygen-containing gas and readily combustible gas. In particular certain conversion processes employ catalyst or flame reaction zones for the partial or complete combustion of gaseous fluids whereby it is critical that ignition is avoided, or at least confined to the reaction zone as appropriate. Moreover, when operating with gaseous fluids at elevated temperature and pressure the ignition hazard is significantly increased. The apparatus and process of the present invention are of particularly beneficial application for such processes.

Accordingly there is provided in a further aspect of the invention a process for the catalytic conversion of fluid substrate comprising contacting a feed comprising the substrate and an oxygen-containing gas at elevated gas hourly space velocity and at elevated temperature and pressure with a catalyst, wherein the fluid substrate and oxygen-containing gas are mixed by the process or with use of the apparatus as hereinbefore defined prior to contacting with the catalyst.

Preferably the feed is mixed in such a manner that the ratio of cross-sectional area of feed entering the upstream stage of the process to cross-sectional area of mixed fluid stream exiting the downstream stage of the process is in the range of 1:3–100, more preferably 1:5–50, still more preferably 1:10–25.

By means of the mixing process of the invention the performance in terms of catalyst feed contacting is improved by the means of the very features which would be problematic in operation using standard diffusion techniques. Specifically by making use of the features of minimising fluid-stream cross-sectional area within the constraints for superficial velocity, pressure differential and erosion and fouling of critical flow impedances an excellent process and apparatus for mixing is provided, which moreover is ideally suited for operation with any suitable mixers as hereinbefore defined. This ensures an admirable compatibility of the apparatus and process for mixing as hereinbefore defined when employed in a process for the catalytic conversion of fluid substrate as hereinbefore defined.

It has been found that excellent fluid mixing may be obtained by appropriate operation of the respective stages of the mixing process as hereinbefore defined, with reference to the process operating conditions to be employed, whereby desired constraints may be observed as hereinbefore defined. It will be appreciated that the choice of extent of mixing, diffusion, fluid flow stabilisation and the like will be determined by the nature of the conversion process and conditions and the level of inherent ignition hazard. In some conversion processes it is essential that substantially 100% conversion takes place, requiring optimum mixing, diffusion, flow stabilisation and the like, whereby it is not possible to minimise the ignition hazard by lowering the reaction pressure or temperature, increasing the superficial velocity at the reaction zone or reducing the fluid flammability by varying the fluid content or residence time. In such conversion processes, the mixing process of the present invention enables safe operation at a maximum conversion level.

Preferably the catalytic conversion process of the invention is a process for the catalytic partial oxidation of hydrocarbon feedstock which comprises contacting a feed comprising a hydrocarbon feedstock and an oxygen-containing gas with a catalyst at a temperature in the range of 800 to 1400° C., especially 950 to 1400° C., preferably 900 to 1300° C., especially 1000 to 1300° C., at a pressure in the range of up to 150 bara, and at a gas hourly space velocity in the range of 20,000 to 100,000,000 Nl/kg/hr. The preferred process is suitably used to prepare a mixture of carbon monoxide and hydrogen in desired ratio from any hydrocarbon feedstock. This process is a means to obtain very useful products known in the art as synthesis gas by means of a highly exothermic reaction, by which the molar ratio of carbon monoxide to hydrogen in the products may be controlled by means of choice of feedstock and operating conditions to give a desired molar ratio of carbon monoxide to hydrogen in the products.

The hydrocarbon is in the gaseous phase when contacting the catalyst. The process is particularly suitable for the partial oxidation of methane, natural gas, associated gas or other sources or light hydrocarbons. In this respect, the term "light hydrocarbons" is a reference to hydrocarbons having from 1 to 5 carbon atoms. The process may be advantageously applied in the conversion of gas from naturally occurring reserves of methane which contain substantial amounts of carbon dioxide. The feed preferably comprises methane in an amount of at least 50% by volume, more preferably at least 70% by volume, especially at least 80% by volume.

The hydrocarbon feedstock is contacted with the catalyst as a mixture with an oxygen-containing gas. Air is suitable for use as the oxygen-containing gas. However, the use of substantially pure oxygen as the oxygen-containing gas may be preferred. In this way, the need for handling a large volume of inert gas, for example nitrogen when using air as the oxygen-containing gas, is avoided. The feed may optionally comprise steam.

The hydrocarbon feedstock and the oxygen-containing gas are preferably present in the feed in such amounts as to give an oxygen-to-carbon ratio in the range of from 0.3 to 0.8, more preferably, in the range of from 0.45 to 0.75. References herein to the oxygen-to-carbon ratio refer to the ratio of oxygen in the form of molecules ($O_2$) to carbon atoms present in the hydrocarbon feedstock.

Preferably, the oxygen-to-carbon ratio is in the range of from 0.45 to 0.65, with oxygen-to-carbon ratios in the region of the stoichiometric ratio of 0.5, that is ratios in the range of from 0.45 to 0.55, being especially preferred. If steam is present in the feed, the steam-to-carbon ratio is preferably in the range of from above 0.0 to 3.0, more preferably from 0.0 to 2.0. The hydrocarbon feedstock, the oxygen-containing gas and steam, if present, are mixed according to the present invention prior to being contacted with the catalyst.

The conversion process of the present invention may be operated at any suitable pressure. For applications on a commercial scale, elevated pressures, that is pressures significantly above atmospheric pressure are most suitably applied. The process may be operated at pressures in the range of up to 150 bara. Preferably, the process is operated at pressures in the range of from 2 to 125 bara, especially from 5 to 100 bara.

The process may be operated at any suitable temperature. Under the preferred conditions of high pressure prevailing in processes operated on a commercial scale, the feed is preferably contacted with the catalyst at high temperatures.

This is necessary if high levels of conversion are to be achieved at the preferred elevated pressures. Accordingly, the feed mixture is preferably contacted with the catalyst at a temperature in excess of 800° C., especially in excess of 950° C., more preferably at a temperature in the range of from 800 to 1400° C., especially of from 950 to 1400° C., more especially from 1000 to 1300° C. The feed mixture is preferably preheated prior to contacting the catalyst.

The feed may be provided during the operation of the process at any suitable space velocity. It is an advantage of the process of the present invention that very high gas space velocities can be achieved. Thus, gas space velocities for the process (expressed in normal litres of gas per kilogram of catalyst per hour) are in the range of from 20,000 to 100,000,000 Nl/kg/hr, more preferably in the range of from 50,000 to 50,000,000 Nl/kg/hr. Space velocities in the range of from 500,000 to 30,000,000 Nl/kg/hr are particularly suitable for use in the process.

The catalyst employed in the process of the present invention comprises a catalytically active metal supported on a refractory oxide carrier, for example as taught in EP-A-0 656 317, the contents of which are incorporated herein by reference. Catalytically active metals for inclusion in the catalyst are selected from Group VIII of the Periodic Table of the Elements. References herein to the Periodic Table are to the CAS version, as published in the CRC Handbook of Chemistry and Physics, 68th Edition. Preferred catalysts for use in the process of the present invention comprise a metal selected from ruthenium, rhodium, palladium, osmium, iridium and platinum. Catalysts comprising ruthenium, rhodium or iridium as the catalytically active metal are particularly preferred. Iridium is a most suitable catalytically active metal.

A most suitable and especially preferred catalyst carrier employed in the process of the present invention is a silica, alumina, titania and/or zirconia foam. Suitable foams for use in the process of this invention are available commercially.

The feed is preferably contacted with the catalyst under adiabatic conditions. For the purposes of this specification, the term "adiabatic" is a reference to reaction conditions under which substantially all heat loss from the reaction zone is prevented, with the exception of heat leaving in the gaseous effluent stream of the reactor.

The carbon monoxide and hydrogen produced by the process of this invention may be used in any process employing either one or both of these compounds. The mixture of carbon monoxide and hydrogen prepared by the process is particularly suitable for use in the synthesis of hydrocarbons, for example by means of the Fischer-Tropsch process, or for the synthesis of oxygenates, for example methanol. Processes for the conversion of carbon monoxide and hydrogen into such products are well known in the art.

Alternatively, the carbon monoxide and hydrogen product may be used in the manufacture of hydrogen by the water-gas shift reaction. Other applications for the products include hydroformylation and carbonylation processes.

DESCRIPTION OF THE DRAWINGS

The invention is now illustrated in non limiting manner with reference to FIGS. 1 to 3.

In FIG. 1 is shown apparatus (1) comprising inlet end (2), mixer (3) including mixing chamber (4), expander (5), insert (6), diffuser (7) including porous shield (8), and outlet end (9). Upstream of the apparatus (1) are provided respective gaseous fluid conduits (10, 11). Gaseous conduits are adapted for the introduction of oxygen-containing gas and combustible gas, such as natural gas. The ratio of mixing of respective gaseous fluids may be controlled by known means such as varying of aperture of respective fluid conduits or varying concentration or flow rate of fluids themselves.

Figure 1:
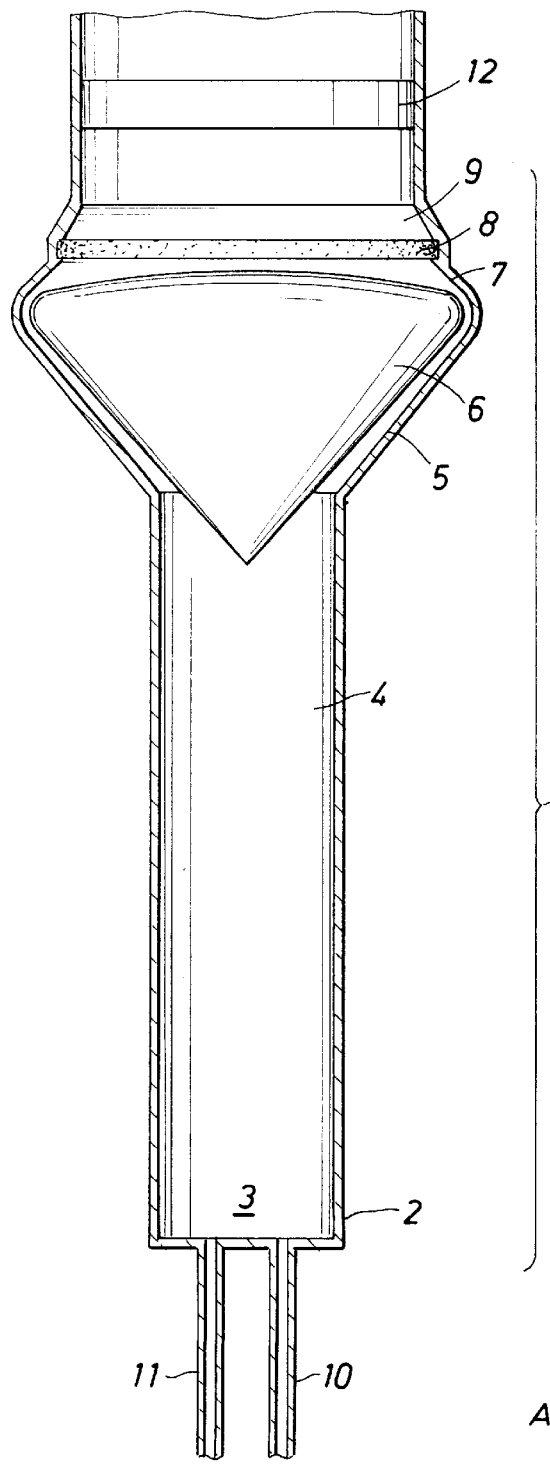
FIG. 1 is a longitudinal cross-section through a catalytic conversion reactor comprising one apparatus for mixing reactive fluids according to the present invention.

Downstream of apparatus (1) is illustrated catalyst (12) comprising a monolithic structure mounted in the fluid flow stream in manner to provide uniform fluid-catalyst contacting with diffused fluid having substantially uniform radial velocity profile.

The gaseous fluids enter the apparatus (1) and are mixed. The mixed fluids enter the expander (5) at its upstream end and are equally divided about axially mounted insert (6). At the downstream section of insert (6) the annular mixed fluid stream merges by radial inward re-entry about the convex surface of insert (6). The diffuser (7) is suitably profiled to provide radial inward momentum component to the mixed fluid stream for the avoidance of flow separation (for example from the wall). The diffused mixed fluid stream passes through porous shield (8) and advances for a sufficient distance for the desired conditioning of feed prior to contacting catalyst (12). The fluids comprising oxygen and natural gas are pre-heated prior to entering the apparatus (1). The reaction is initiated by ignition of feed at the catalyst, whereby gaseous fluids are brought to reaction temperature on approaching the catalyst. Accordingly the mixer (3, 4), expander (5), insert (6) and diffuser (7) are constructed of suitable materials having heat resistance in excess of 400° C., suitably are constructed of metal alloy and similar compatible materials. The catalyst is suitably a catalytically active material as hereinbefore defined supported on a porous monolithic disc-shaped carrier as hereinbefore defined.

Figure 2:
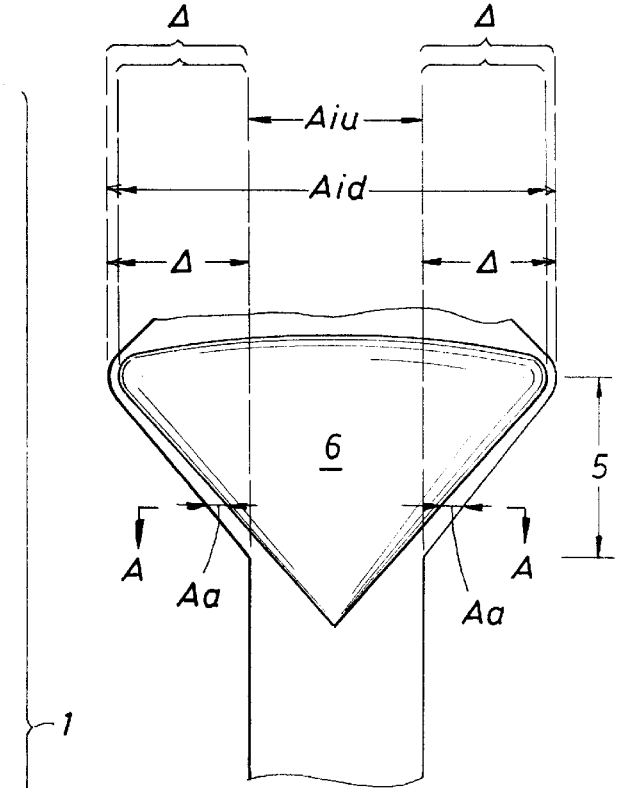
FIG. 2 is a longitudinal cross-section through the expander and the upstream receiving section of the diffuser of the reactor of FIG. 1.

In FIG. 2 is shown the expander (5)and insert (6) of FIG. 1 wherein the available cross-section area (Aa) is shown, on a section A—A, as being less than the difference in the expander internal cross-sectional area at its downstream and upstream ends respectively (Aid and Aiu respectively).

Figure 3:
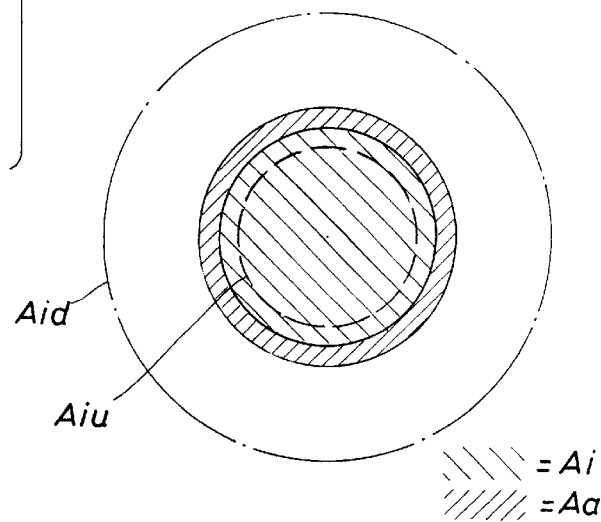
FIG. 3 is a cross-section taken through a plane perpendicular to the longitudinal axis of the expander portion of the reactor of FIG. 1.

In FIG. 3 is shown the internal and available cross-sectional area (Ai and Aa) on the section A—A through FIG. 2, and broken lines show the confines defining Aid and Aiu of FIG. 2.

EXAMPLES

The invention is now illustrated in non-limiting manner, with reference to the following examples.

Example 1—Auto-Ignition Tests

Methane and oxygen were provided at a pressure in the range of 50 to 60 bara and at a temperature of up to 300° C. to conduits (10) and (11) respectively of the apparatus of FIG. 1, were thoroughly mixed. Mixing was at an oxygen-to-carbon ratio of 0.5. The combined feed was supplied at gas hourly space velocity of 2,000,000 Nl/kg/hr.

In the temperature range of up to 300° C., no auto-ignition occurred.

Example 2—Fluid Flow Profiles according to the Invention

The process of Example 1 was repeated at atmospheric conditions. The resultant stream was analysed at the outlet end (9).

The flow velocity and oxygen concentration of the gas leaving the reactor were measured by pitot tube and by univox.

The velocity profile was substantially uniform within 20%, neglecting surface effects. The oxygen partial pressure varied less than 1% over the cross-section.

Example 3—Limitation of Ignition or Misoperation Damage

The process of Example 1 was repeated. Accidental ignition was initiated. Damage due to the explosion that followed ignition was limited to a deformation of the internals. Safe shutdown of the process was achieved.

Accordingly, it will be apparent that the apparatus of the invention may be employed in admirable manner in the process of the invention as hereinbefore defined.

What is claimed is:

1. Apparatus for mixing reactive fluids which are capable of ignition or explosion, at elevated temperature and pressure, for subsequent conversion by contact with a catalyst, such as a (partial) oxidation catalyst or in a combustion zone, comprising in sequence an upstream inlet end, a mixer, an expander, a diffuser and a downstream outlet end, the outlet end having a greater available cross-sectional area than any of the inlet end, mixer and expander, and the expander having an internal cross-sectional area that is increasing in the downstream direction such that the internal cross-sectional area at the downstream end of the expander is at least 4 times the internal cross-sectional area at the upstream end, wherein the expander comprises an insert which is non-porous and which is adapted to be located in the expander, thereby modifying the available cross-section thereof and wherein the available cross-sectional area of the expander at any point along its length is less than the difference in internal cross-sectional area of the expander at its downstream and its upstream ends, and wherein the available cross-sectional area at the upstream receiving section of the diffuser is rapidly increasing, to equalize with the internal cross-sectional area thereof, whereby the diffuser is of constant and equal internal and available cross-sectional area at its down stream section wherein the insert comprises an upstream and a downstream section and the cross-sectional area is largest at the interface of the upstream and downstream sections, wherein the upstream section has an increasing cross-sectional area in the downstream direction, whereby the insert is adapted to be axially mounted within the expander there by having its interface of the upstream and downstream sections at the downstream end of the expander in a manner to provide an annular fluid stream path in the expander of increasing radius in the downstream direction.

2. Apparatus according to claim 1 wherein the expander and the upstream section of the insert are defined by a cone half angle which is in the range of from about 30° to about 90° to the axis.

3. Apparatus according to claim 2 wherein the expander and the upstream section of the insert are defined by a cone half angle which is in the range of form about 50° to about 70° to the axis.

4. Apparatus for mixing reactive fluids which are capable of ignition or explosion, at elevated temperature and pressure, for subsequent conversion by contact with a catalyst, such as a (partial) oxidation catalyst or in a combustion zone, comprising in sequence an upstream inlet end, a mixer, an expander, a diffuser and a downstream outlet end, the outlet end having a greater available cross-sectional area than any of the inlet end, mixer and expander, and the expander having an internal cross-sectional area that is increasing in the downstream direction such that the internal cross-sectional area at the downstream end of the expander is at least 4 times the internal cross-sectional area at the upstream end, wherein the expander comprises an insert which is non-porous and which is adapted to be located in the expander, thereby modifying the available cross-section thereof and wherein the available cross-sectional area of the expander at any point along its length is less than the difference in internal cross-sectional area of the expander at its downstream and its upstream ends, and wherein the available cross-sectional area at the upstream receiving section of the diffuser is rapidly increasing, to equalize with the internal cross-sectional area thereof, whereby the diffuser is of constant and equal internal and available cross-sectional area at its downstream section wherein the available cross-sectional area of the expander is less than 75% of the difference in internal cross-sectional area of the expander at its downstream and upstream ends wherein the insert comprises an upstream and a downstream section and the cross-sectional area is largest at the interface of the upstream and downstream sections, wherein the upstream section has an increasing cross-sectional area in the downstream direction, whereby the insert is adapted to be axially mounted within the expander thereby having its interface of the upstream and downstream sections at the downstream end of the expander in a manner to provide an annular fluid stream path in the expander of increasing radius in the downstream direction.

5. Apparatus according to claim 4 wherein the expander and the upstream section of the insert are defined by a cone half angle which is in the range of from about 30° to about 90° to the axis.

6. Apparatus according to claim 5 wherein the expander and the upstream section of the insert are defined by a cone half angle which is in the range of from about 50° to about 70° to the axis.

* * * * *